United States Patent [19]
Wu

[11] Patent Number: 5,492,512
[45] Date of Patent: Feb. 20, 1996

[54] BRAKE SYSTEM WITH WHEEL-REVERSING MEANS FOR AN AUTOMOBILE

[75] Inventor: Ying-Hao Wu, Tainan, Taiwan

[73] Assignee: Chung-Da Wu, Taipei, Taiwan

[21] Appl. No.: 328,143

[22] Filed: Oct. 24, 1994

[51] Int. Cl.⁶ .................................................. B60K 41/02
[52] U.S. Cl. ............................ 477/73; 477/74; 475/293; 475/900; 180/244
[58] Field of Search .................................. 477/71, 73, 74; 475/254, 293, 900; 192/4 A; 180/244, 370

[56] References Cited

U.S. PATENT DOCUMENTS

| | | | |
|---|---|---|---|
| 4,037,694 | 7/1977 | Keese | 192/4 A |
| 4,518,067 | 5/1985 | Jow et al. | 477/71 |
| 4,633,984 | 1/1987 | Hudson | 475/900 X |
| 4,893,691 | 1/1990 | Park | 192/4 A X |
| 5,366,040 | 11/1994 | Irikura et al. | 180/244 |

*Primary Examiner*—Charles A. Marmor
*Assistant Examiner*—Peter Kwon

*Attorney, Agent, or Firm*—Rines and Rines

[57] ABSTRACT

A brake system for an automobile comprises a planetary gear set, a clutch operating unit and an emergency braking unit. The planetary gear set is disposed between gear and clutch assemblies of the automobile and includes a bell-shaped casing with a central neck connected securely to an input shaft of the gear assembly. The bell-shaped casing has an annular wall portion with an internal thread therein, a sun gear disposed centrally in the casing and fixed to a clutch shaft of the clutch assembly which passes axially and centrally therethrough, and a planet gear which meshes with the internal thread of the casing and the sun gear. The planet gear has a planet shaft connected rotatably to a clutch shell of the clutch assembly. The clutch operating unit is actuated to unfasten the clutch shell from the clutch shaft while the emergency braking unit is operated to brake the clutch shell from rotating and permitting the casing to be rotated by the engine in a direction opposite to an original direction, thereby turning the wheel of the automobile in a rearward direction so as to stop the automobile from running forward, and to increase instantaneously an extra amount of fuel to the engine of the automobile to retain the engine in a functioning mode.

3 Claims, 12 Drawing Sheets

BRAKE SYSTEM WITH WHEEL-REVERSING MEANS FOR AN AUTOMOBILE

BACKGROUND OF THE INVENTION

1. Field of the Invention

The invention relates to a brake system, more particularly to a brake system which is used for braking a forward running automobile during an emergency and which has wheel-reversing means to urge forward running wheels of the automobile to rotate in a reverse direction so as to stop the automobile within a short distance and prevent the same from skidding during braking.

2. Description of the Related Art

In an automobile, a brake pedal of a conventional brake system is operated for braking the running wheels of an automobile. It generally happens that, although rotation of the braked wheels is stopped as soon as the brake pedal is operated, the braked wheels keep on sliding to result consequently in skidding. Thus, an accident is likely occur.

Presently, another conventional brake system, known as the anti-brake locking system (A.B.S), is installed in some of the automobiles. The A.B.S includes a computerized device which enables the brake shoes to brake the running wheels intermittently and swiftly, thereby stopping the automobile and preventing skidding of the latter. However, the running automobile stops running only after traveling a relatively long distance upon the braking thereof.

SUMMARY OF THE INVENTION

Therefore, the main objective of the present invention is to provide a brake system for an automobile which is to be used during an emergency and which includes wheels-reversing means for stopping the automobile in a short distance without causing skidding thereof.

Accordingly, the brake system of the present invention is to be installed in an automobile. The automobile includes an engine, a gear assembly and a clutch assembly connected operably to the engine and detachably to an input shaft of the gear assembly for transmitting rotation of the engine via the gear assembly to turn a wheel of the automobile. The clutch assembly has a clutch shaft connected to the engine, and a clutch shell mounted rotatably around the clutch shaft and adapted to be fastened detachably thereon so as to co-rotate with the clutch shaft in a first direction. The brake system of the present invention comprises a planetary gear set provided between the clutch and gear assemblies. The planetary gear set includes a bell-shaped casing which has a central neck that is connected securely to the input shaft of the gear assembly and which has an annular wall portion with an internal thread therein. The planetary gear set further includes a sun gear disposed centrally in the bell-shaped casing and fixed to the clutch shaft which passes axially and centrally therethrough, and a planet gear meshing with the internal thread of the bell-shaped casing and the sun gear. The planet gear has a planet shaft connected rotatably to the clutch shell. The brake system further includes a clutch operating means and an emergency braking means. The clutch operating means is used for unfastening the clutch shell from the clutch shaft when the emergency braking means is used to stop the clutch shell from rotating and to permit rotation of the bell-shaped casing by the engine in a second direction opposite to the first direction. Therefore, the running wheel of the automobile is turned in a rearward direction so as to stop the automobile from running forward. At the same time, an extra amount of fuel is fed instantaneously to the engine to retain the engine in a functioning mode. Thus, the automobile stops in a short distance as soon as the emergency braking means is actuated simultaneously with the clutch operating means.

In the preferred embodiment, the emergency braking means includes a pair of brake shoes for clamping the clutch shell to prevent the latter from rotating, an emergency pedal for actuating the pair of brake shoes, and a fuel supplying valve which is communicated with the engine. The fuel supplying valve is adapted to be opened by the emergency pedal.

BRIEF DESCRIPTION OF THE DRAWINGS

Other features and advantages of the present invention will become more apparent in the following detailed description of the preferred embodiment with reference to the accompanying drawings, in which.

DETAILED DESCRIPTION OF THE PREFERRED EMBODIMENT

Figure 1:
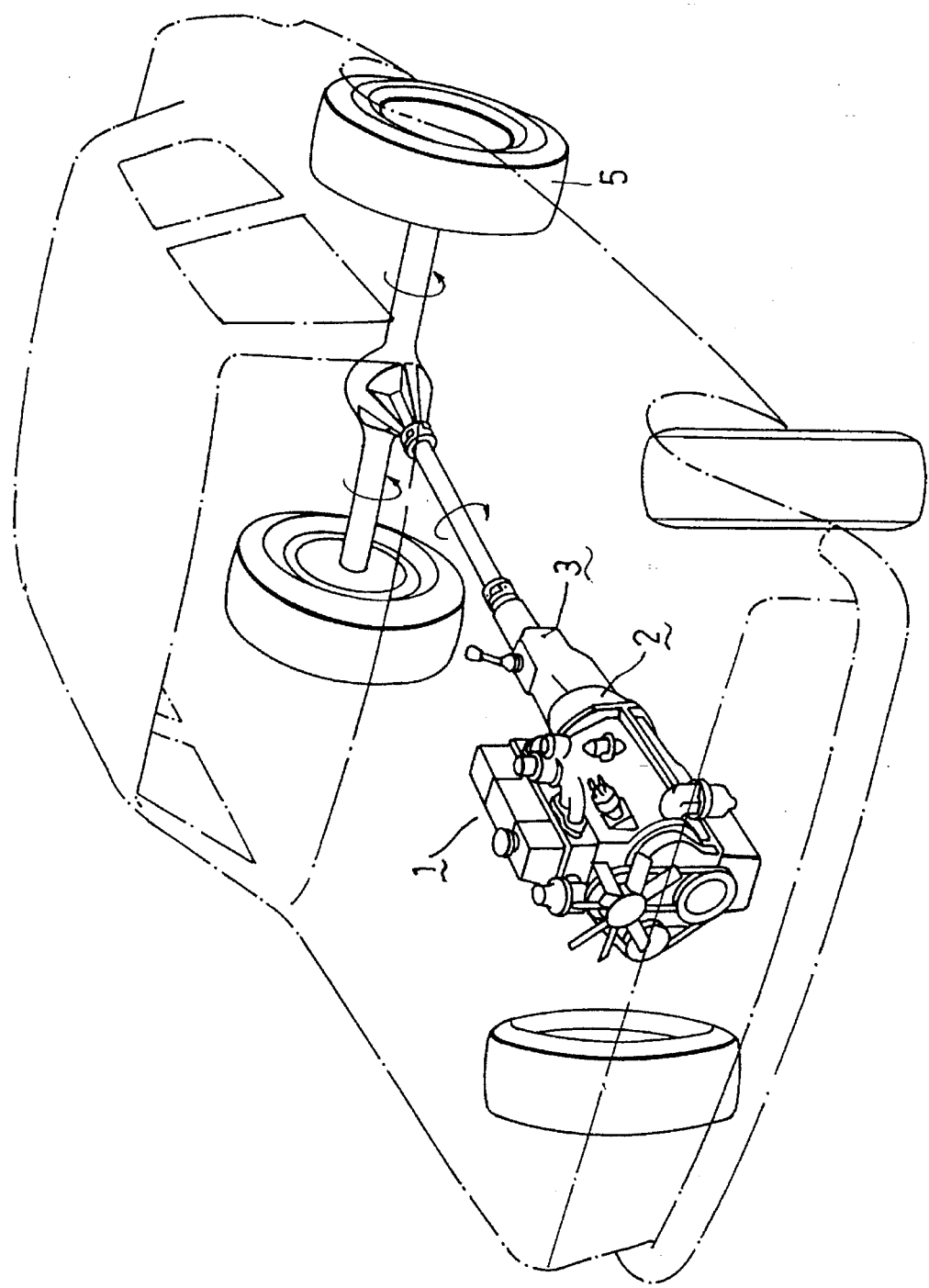
FIG. 1 shows a conventional driving mechanism of an automobile.
Figure 2:
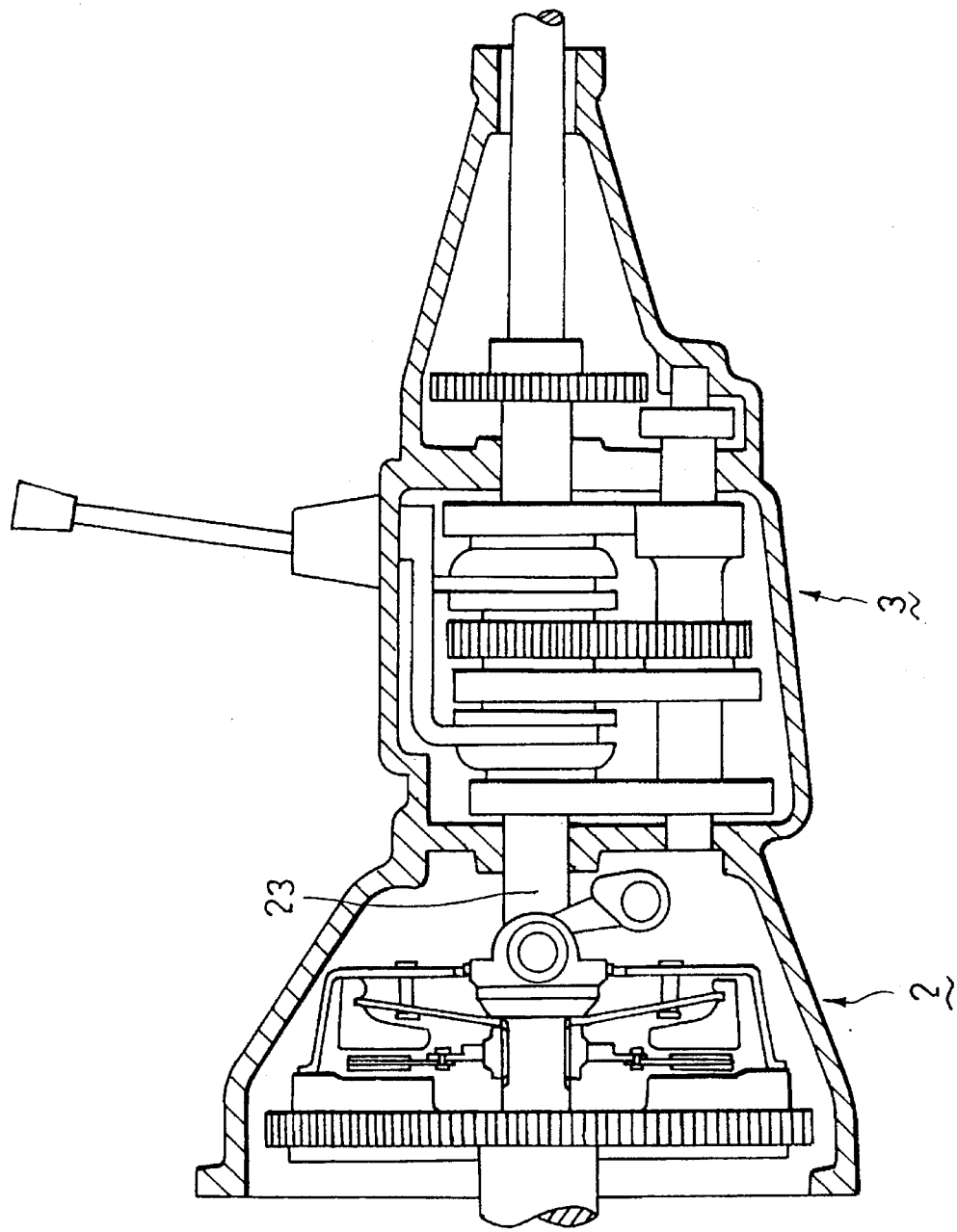
FIG. 2 shows a clutch assembly and a gear assembly of the conventional driving mechanism of an automobile.

Referring to FIGS. 1 and 2, a conventional driving mechanism of an automobile includes an engine 1, a gear assembly 3 and a clutch assembly 2 connected operably to the engine 1 and detachably to an input shaft 23 of the gear assembly 3 for transmitting rotation of the engine 1 via the gear assembly 2 to turn rear wheels 5 of the automobile.

Since the same gear assembly 3 is used in the present preferred embodiment, the same reference numeral will be used throughout the disclosure.

Figure 3:
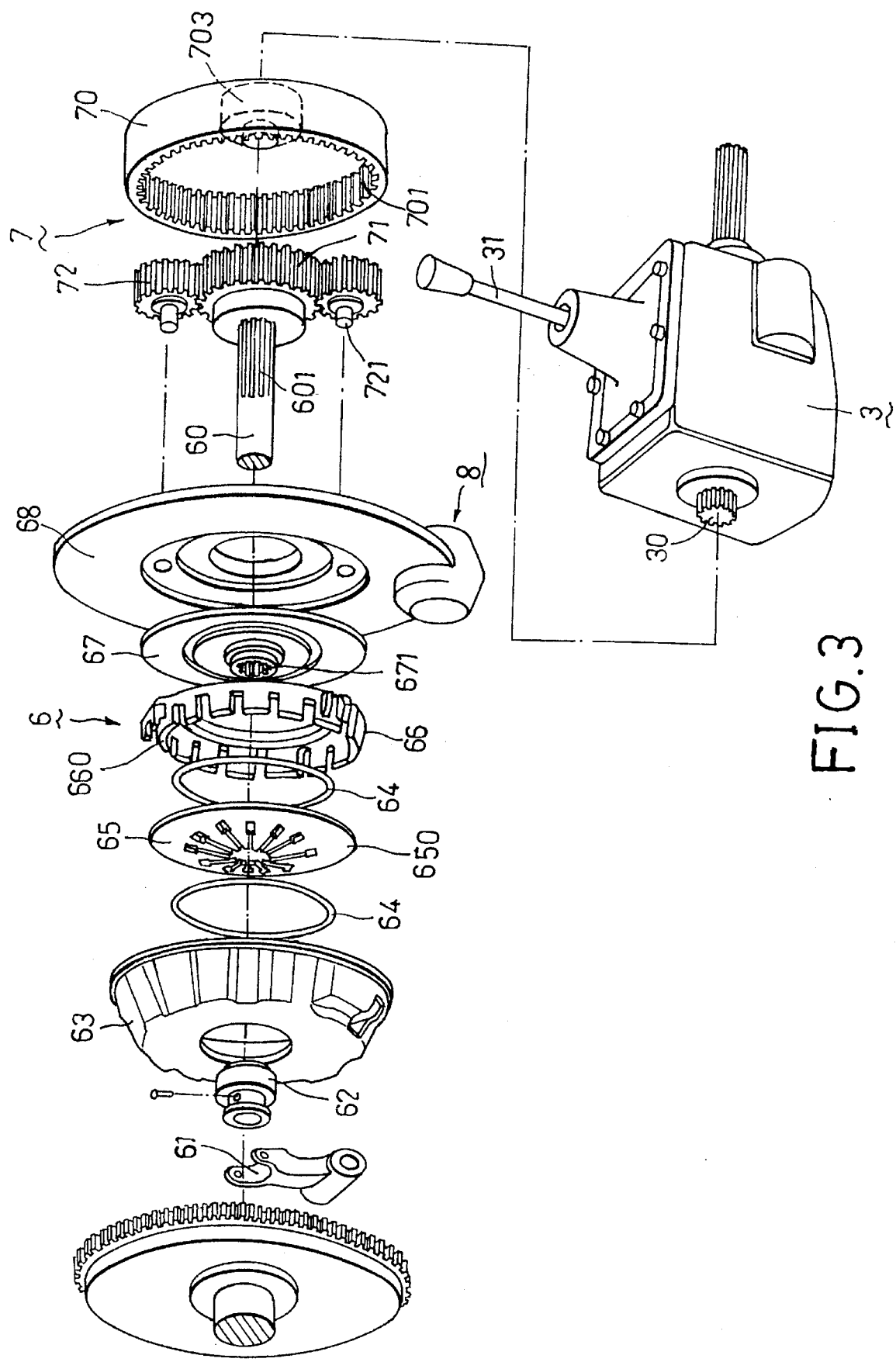
FIG. 3 shows a preferred embodiment of the present invention which includes a planetary gear set installed between the clutch and gear assemblies.
Figure 4:
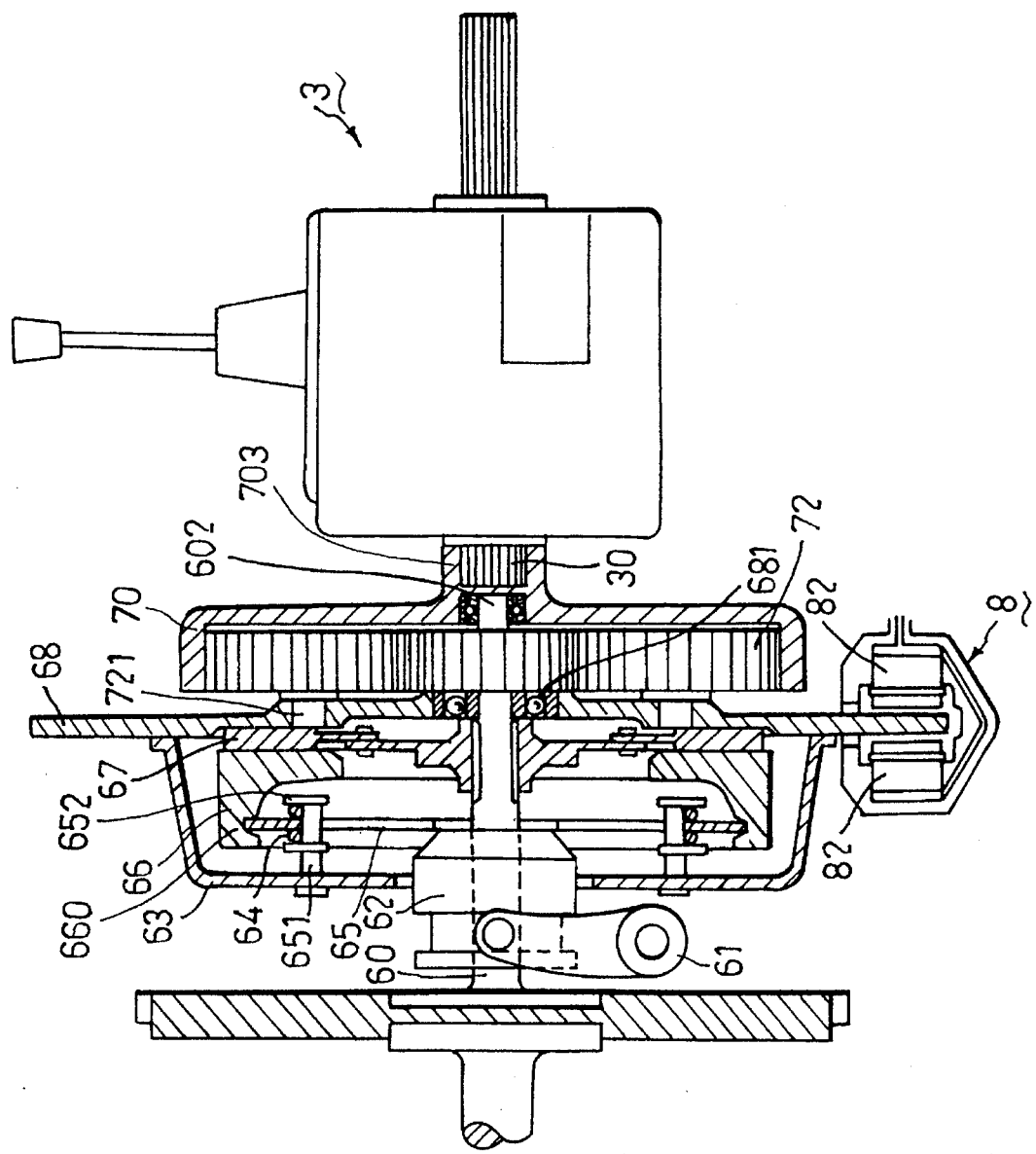
FIG. 4 illustrates a cross sectional view of the preferred embodiment of the present invention shown in FIG. 3.

Referring to FIGS. 3 and 4, the clutch assembly 6 employed in the preferred embodiment of the present invention includes a clutch shaft 60, a rotating disk 68, a follower plate 67, a pressure member 66, a disk spring 65, two supporting rings 64, a clutch cover 63, a release member 62, a clutch fork 61, and a clutch operating means. The rotating disk 68 is mounted rotatably on the clutch shaft 60. The clutch cover 63 is passed through by the clutch shaft 60 and is mounted onto the rotating disk 68 so as to form a clutch shell. The clutch shaft 60 has a plurality of axial splines 601 of predetermined length. The follower plate 67 is disposed within the clutch shell and is mounted movably along the clutch shaft 60. The follower plate 67 has internal splines 671 which engage the axial splines 601 of the clutch shaft 60 so as to co-rotate therewith. The pressure member 66 is mounted within the clutch shell around the clutch shaft 60 next to the follower plate 67 and has a peripheral flange 660 which extends in a direction opposite to the follower plate 67. The disk spring 65 is disposed within the clutch shell and has a circular periphery 650 attached to the peripheral flange 660 of the pressure member 66. A circle of fasteners 651 extend through positions adjacent to the circular periphery 650 of the disk spring 65 and are secured onto the clutch cover 63 such that the disk spring 65 compresses the pressure member 66 to bias the follower plate 67 against the rotating disk 68 at a normal condition. Thus, the whole clutch assembly 6 can rotate together with the follower plate 67 when the follower plate 67 is driven by the clutch shaft 60 in a first direction. Note that each of the fasteners 651 has two retaining flanges 652 located on both side of the disk spring 64, and the supporting rings 64 are placed around the circle of fasteners 651 on both sides of the disk spring 65 so as to retain the disk spring 65 stationary thereat.

Figure 5:
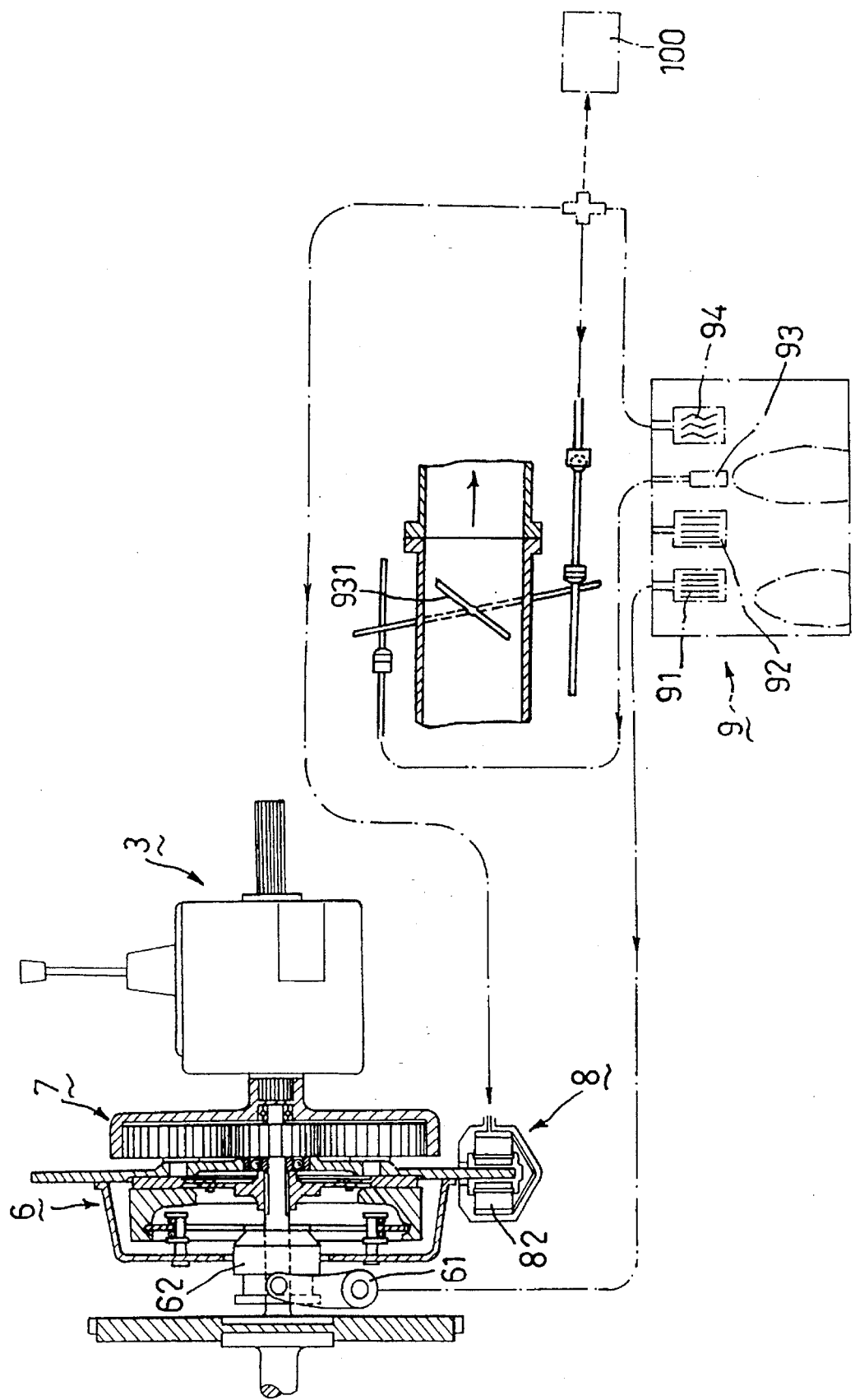
FIG. 5 illustrates how the preferred embodiment of the present invention is connected to an operating pedal.
Figure 7:
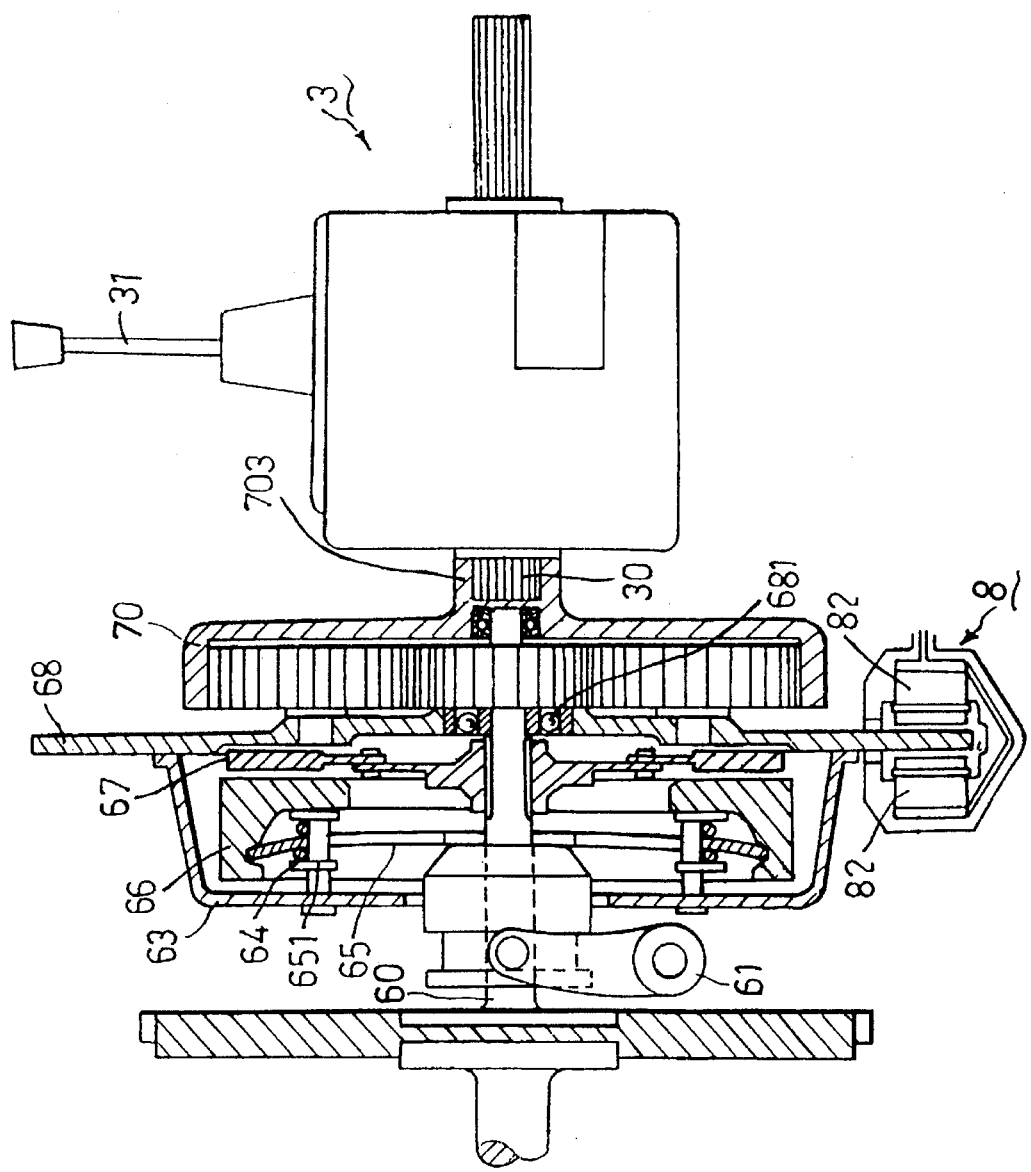
FIG. 7 shows a cross-sectional view of the preferred embodiment of the present invention, the clutch assembly being illustrated at an actuated condition.

Referring to FIG. 5, the clutch operating means includes a release member 62, a clutch fork 61 and a clutch pedal 91 which is usually installed under a driver's seat (not shown). The release member 62 is sleeved slidably on the clutch shaft 60 and extends partially into the clutch shell via the clutch cover 63 to abut against the disk spring 65. The clutch fork 61 has a first end which is connected pivotally to the release member 62 and a second end which is connected operably to the clutch pedal 91. Thus, when the clutch pedal 91 is operated, the clutch fork 61 is actuated to compress the release member 62 to move along the clutch shaft 60 to bias a portion of the disk spring 65 around the clutch shaft 60 to deform resiliently the disk spring 65. Deformation of the disk spring 65 bends the circular periphery 650 of the disk spring 65 toward the clutch cover 63 and releases the pressure member 66 from the follower plate 67, as shown in FIG. 7.

Figure 6:
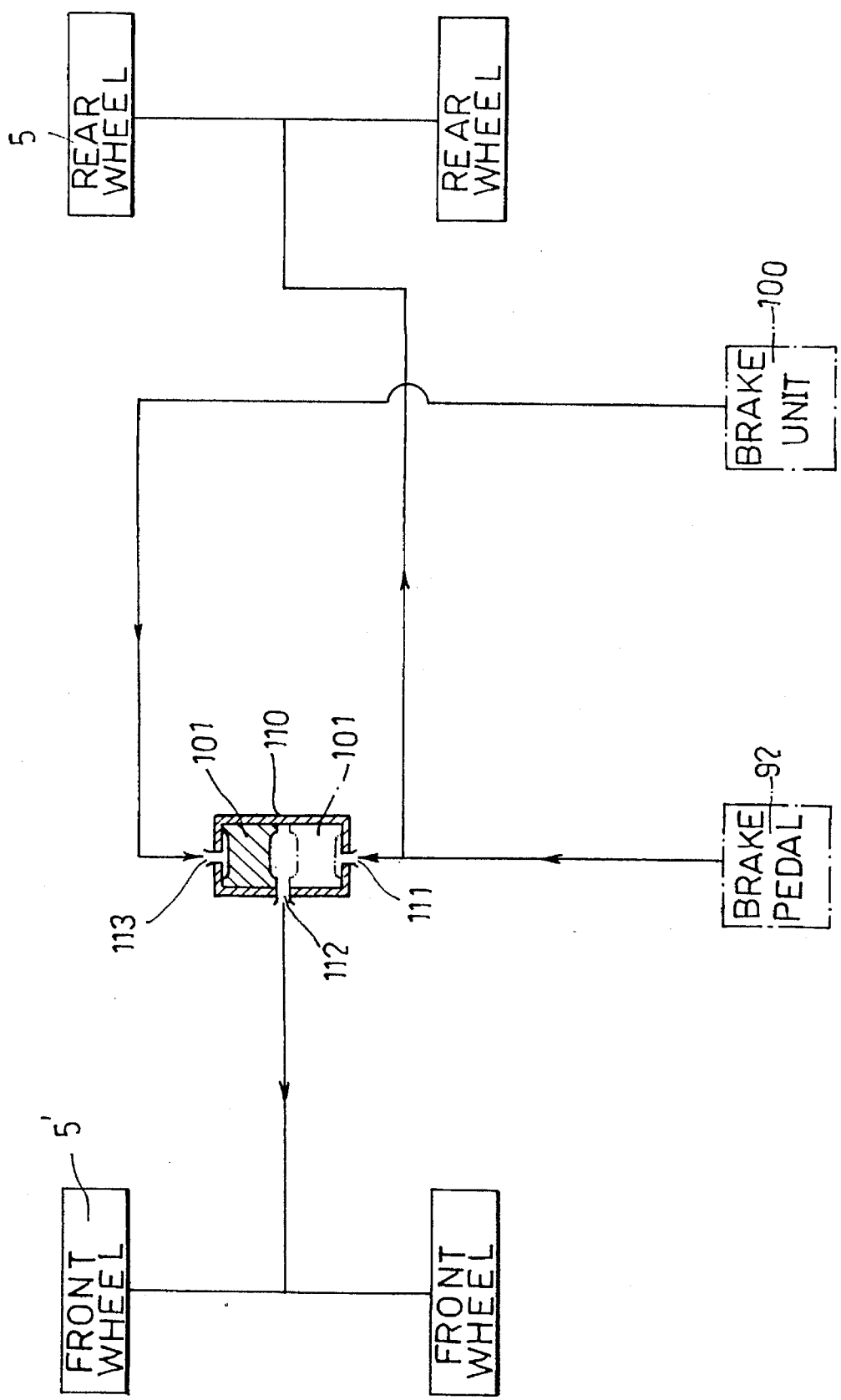
FIG. 6 shows an added part of the preferred embodiment of the present invention.
Figure 8:
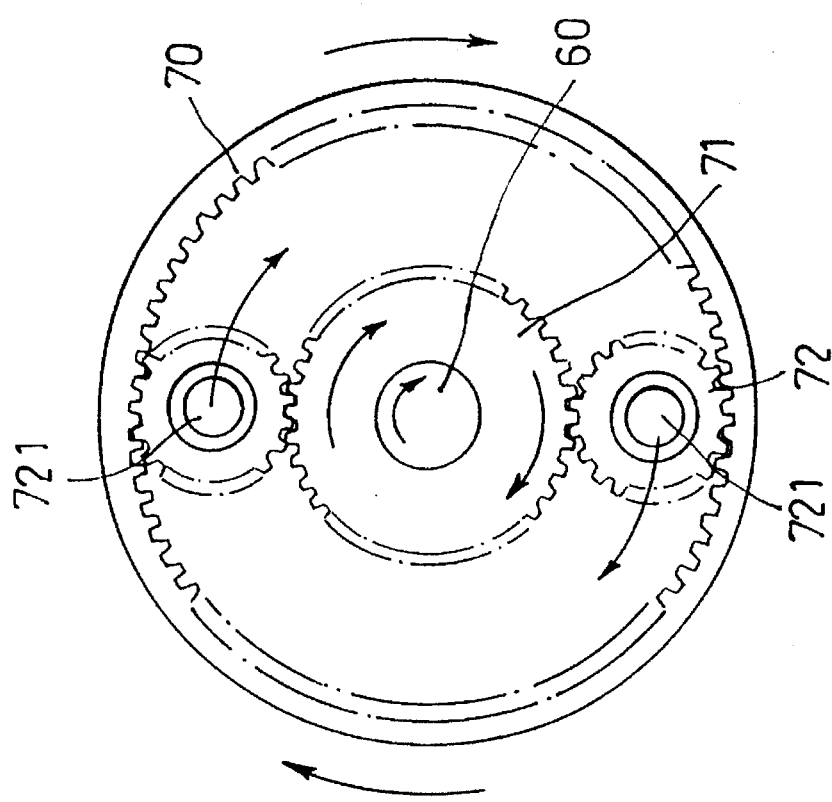
FIG. 8 shows the configuration of the planetary gear set when the clutch assembly is not actuated and an emergency brake pedal is not operated.

Referring to FIGS. 5, 6 and 8, a planetary gear set 7 is provided between the clutch and gear assemblies 6, 3 and includes a bell-shaped casing 70 with a central neck 703 connected threadedly to the input shaft 30 of the gear assembly 3. The bell-shaped casing 70 has an annular wall portion with an internal thread 701 therein. The planetary gear set 7 further includes a sun gear 71 disposed centrally in the bell-shaped casing 70 and fixed to the clutch shaft 60 which passes axially and centrally therethrough, and two planet gears 72 which mesh with the internal thread 701 of the bell-shaped casing 70 and the sun gear 71. Each of the planet gears 72 has a planet shaft 721 connected rotatably to the rotating disk 68 of the clutch assembly 6.

The emergency braking means 9 includes a pair of brake shoes 82 for stopping the clutch shell 6 from rotating, an emergency brake pedal 94 for actuating the pair of brake shoes 82 which are disposed in a brake casing 8, and a fuel supplying valve 931 connected to the engine (not shown). The emergency brake pedal 94 is communicated with the fuel supplying valve 931, the pair of brake shoes 82 and another braking unit 100 via a cross piping 90.

Figure 9:
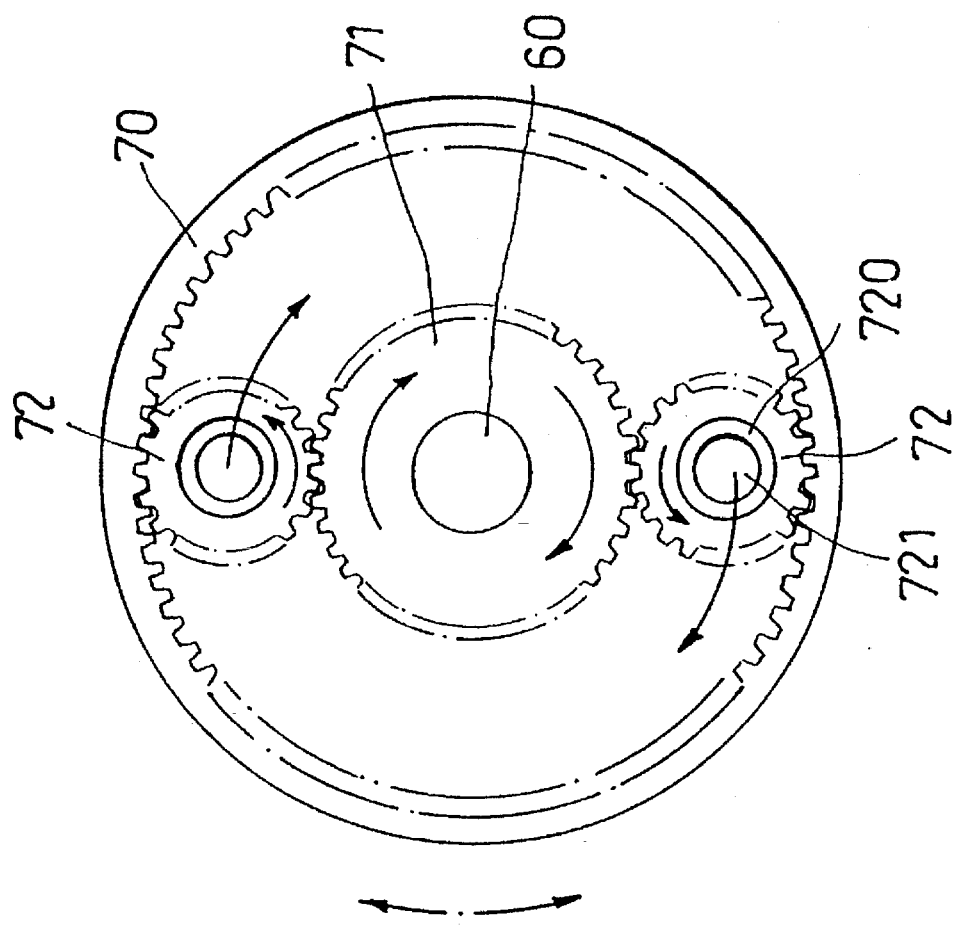
FIG. 9 shows the configuration of the planetary gear set when the clutch assembly is actuated while the emergency brake pedal is not stepped.
Figure 10:
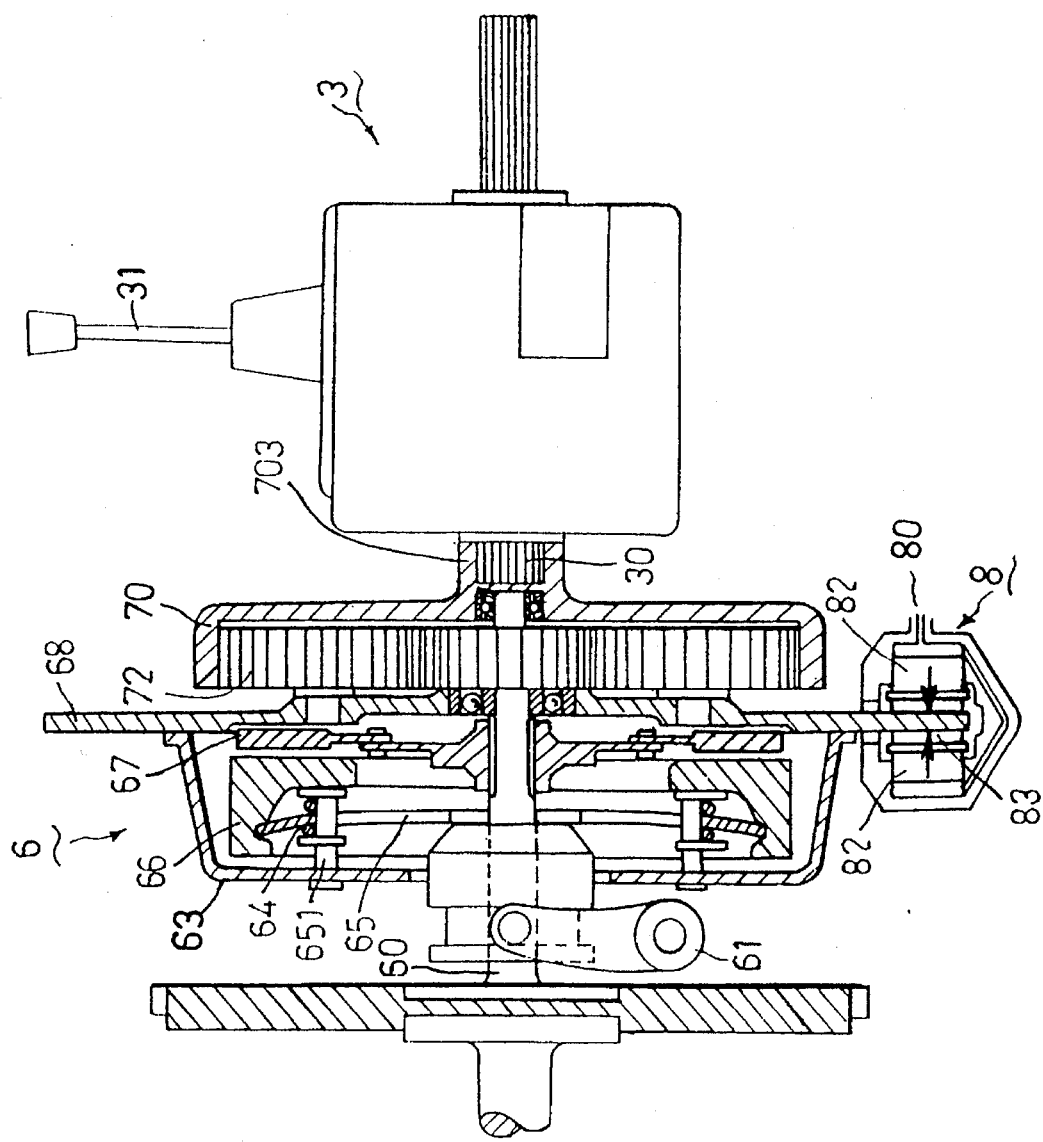
FIG. 10 shows the relationship among the clutch assembly and the shoe brakes of the preferred embodiment of the present invention when the emergency brake pedal is operated.
Figure 11:
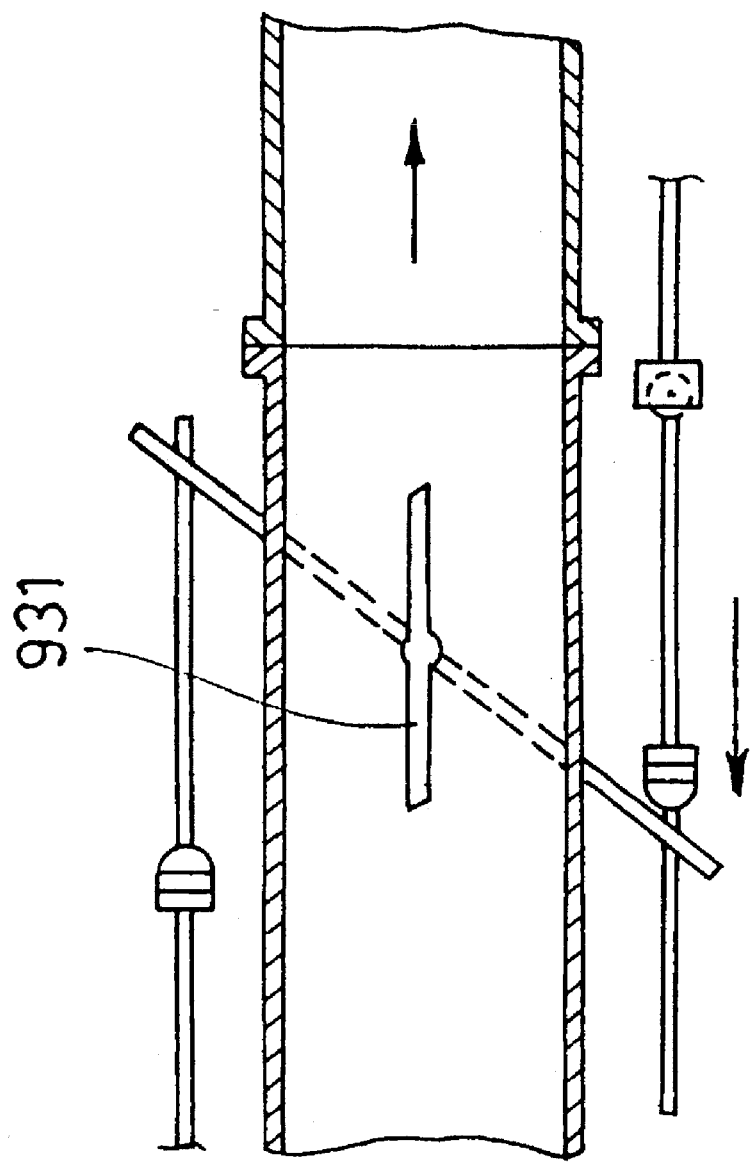
FIG. 11 shows how a fuel supplying valve employed in the preferred embodiment of the present invention acts when the emergency brake pedal is operated.

FIG. 8 shows the direction of rotation of the bell-shaped casing 70, the sun gear 71 and the planet gears 72 when the automobile is in a forward running condition. Note that during an emergency, the emergency brake pedal 94 is operated simultaneously with the clutch pedal 91. The actuation of the clutch pedal 91 causes the pressure member 66 to disengage from the follower plate 67, while the rotating disk 68 of the clutch shell is clamped to a stopped position by the brake shoes 82, as shown in FIG. 10. The operation of the emergency brake pedal 94 opens the fuel supplying valve 931 by a larger degree so as to increase instantaneously an amount of fuel to the engine to retain the engine in a functioning mode (see in FIG. 11). Note that when the automobile is in the forward running condition, the rotation of the engine 1 is transmitted to the gear assembly 3 via the clutch shaft 60, the follower plate 67, the rotating disk 68, the sun gear 71, the planet gears 72 and finally, via the bell-shaped casing 70. When only the clutch pedal 91 is actuated, the rotation of the engine 1 is not transmitted to the gear assembly 3 via the clutch assembly 6, since disengagement of the pressure member 66 from the follower plate 67 fails to rotate forcedly the bell-shaped casing 70 via the rotating disk 68, and since the force which is transmitted by the sun gear 71 can only rotate the planet gears 72 to move rotatingly along the internal thread 701 of the bell-shaped casing 70. Thus, the bell-shaped casing 70 is left idle relative to the sun and planet gears 71, 72, as shown in FIG. 9.

Figure 12:
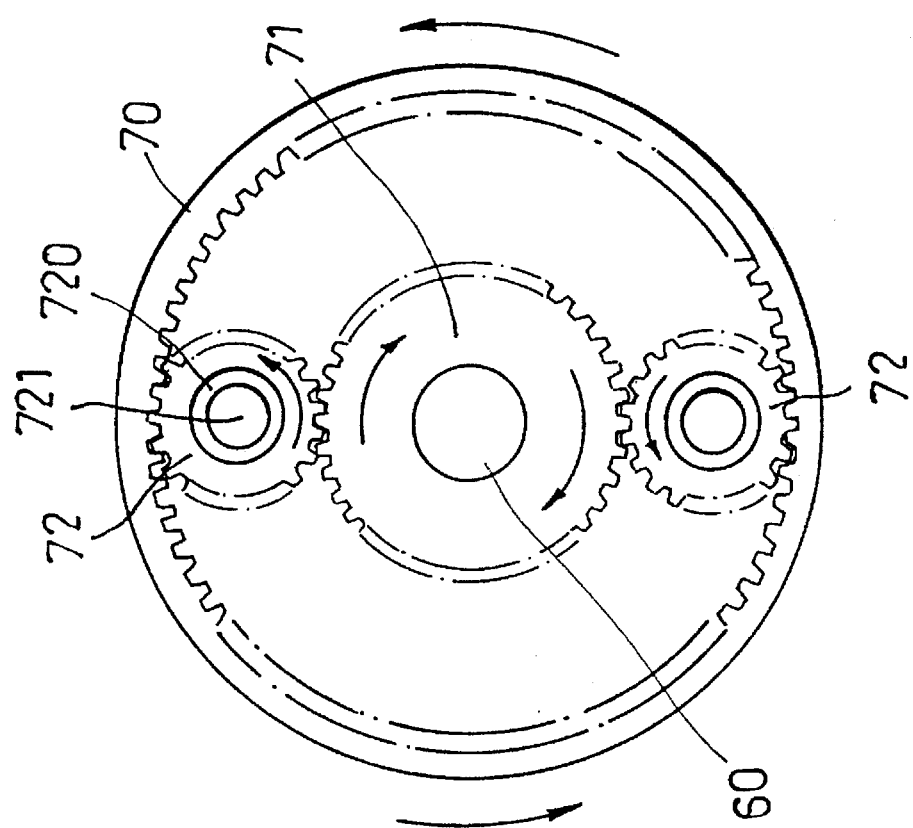
FIG. 12 shows the configuration of the planetary gear set when the emergency brake pedal is operated while the clutch assembly is actuated.

When the emergency brake pedal 94 is operated synchronously with the clutch pedal 91, since the planet shafts 721 of the planet gears 72 are connected rotatably to the rotating disk 68 which is braked by the brake shoes 82, the bell-shaped casing 70 is forced by the sun gear 71 via the planet gears 72 to rotate in a second direction opposite to the first direction, as shown in FIG. 12. Since the forward running rear wheels 5 are connected fixedly to the bell-shaped casing 70 via the gear assembly 3, the rear wheels 5 are turned in a rearward direction. Thus, the running automobile stops within a short distance as soon as the clutch pedal 91 and the emergency brake pedal 94 are operated synchronously. Under this condition, the rear wheels 5 will be rotated in the rearward direction as if the automobile is backing in the rearward direction with the highest gear. Thus, the automobile ceases to move forward further. The automobile may even move by a small distance in the rearward direction which can be stopped by the operation of the conventional brake pedal 92. In the design of the planetary gear set 7, the thread ratios of the sun gear 71 and the internal thread of the bell-shaped casing 70 is preferably between 1:4 or 1:5, corresponding to the teeth ratio of the reverse gear. When the emergency brake pedal 94 is operated, the gear assembly 3 is usually at a high speed position (the teeth ratio being at 1:1 or 0.75). Therefore, after the rotating disk 68 is locked, the initiating reverse rotation of the bell-shaped casing 70 corresponds to the reverse speed under normal conditions. Thus, the rear wheels 5 rotate with a high torque in the rearward direction so as to stop the forward running wheels.

Referring to FIG. 6, the brake unit 100 is operably connected to a hydraulic chamber 110 via an opening 113 of the same. The hydraulic chamber 110 has a piston 101 disposed slidably therein and two connecting tubes 111, 112 connected respectively to front wheels 5' via a conventional brake means (not shown) and the conventional brake pedal 92. Thus, when the emergency brake pedal 94 is operated, the brake unit 100 is actuated and the front wheels 5' of the running automobile are braked via the hydraulic chamber 110 and the conventional brake means (not shown). After the emergency brake pedal 94 is released, the front wheel 5' is braked to a congestedly position by operating the conventional brake pedal 92. Thus, the front wheels 5' stop synchronously with the rear wheels 5.

With the invention thus explained, it is obvious to those skilled in the art that various modifications and variation can be made without departing from the scope and spirit of this invention. It is therefore intended that this invention be limited only as in the appended claims.

I claim:

1. A brake system for an automobile, said automobile including an engine, a gear assembly and a clutch assembly connected operably to said engine and detachably to an input shaft of said gear assembly for transmitting rotation of said engine via said gear assembly to turn a wheel of said automobile, said clutch assembly having a clutch shaft connected to said engine, and a clutch shell mounted rotatably around said clutch shaft and adapted to be fastened detachably thereon so as to co-rotate with said clutch shaft in a first direction, said brake system comprising:

a planetary gear set provided between said clutch and gear assemblies and including a bell-shaped casing with a central neck connected securely to said input shaft of said gear assembly, said bell-shaped casing having an annular wall portion with an internal thread therein, said planetary gear set further including a sun gear disposed centrally in said bell-shaped casing and fixed on said clutch shaft which passes axially and centrally therethrough, and a planet gear meshing with said internal thread of said bell-shaped casing and said sun gear, said planet gear having a planet shaft connected rotatably to said clutch shell;

a clutch operating means for unfastening said clutch shell from said clutch shaft; and an emergency braking means for braking said clutch shell from rotating and permitting said bell-shaped casing to be rotated by said engine in a second direction opposite to said first direction, thereby turning said wheel of said automobile in a rearward direction so as to stop said automobile from running forward, and for increasing instantaneously an extra amount of fuel to said engine to retain said engine in a functioning mode.

2. The brake system as defined in claim 1, wherein said emergency braking means includes a pair of brake shoes for stopping said clutch shell from rotating, an emergency brake pedal for actuating said pair of brake shoes and a fuel supplying valve connected to said engine, said fuel supplying valve being adapted to be opened by said emergency brake pedal.

3. The brake system as defined in claim 1, wherein said clutch assembly includes a rotating disk mounted rotatably around said clutch shaft and a clutch cover passed through by said clutch shaft and mounted to said rotating disk to define said clutch shell, said clutch assembly further including a follower plate passed through by said clutch shaft and movably mounted therealong within said clutch shell, a pressure member with a peripheral flange extending therefrom, said pressure member being passed through by said clutch shaft and being disposed in said clutch shell next to said follower plate, said peripheral flange extending in a direction opposite to the follower plate, a disk spring disposed within said clutch shell and passed through by said clutch shaft, said disk spring having a circular periphery attached to said peripheral flange of said pressure member, and a plurality of fasteners for connecting positions adjacent to said circular periphery of said disk spring to said clutch cover and for compressing said pressure member to bias said follower plate against said rotating disk at a normal condition such that said whole clutch assembly can rotate together with said follower plate while said follower plate is driven by said clutch shaft;

said clutch operating means including a release member sleeved slidably on said clutch shaft and extending partially into said clutch shell via said clutch cover to abut said disk spring, and a clutch fork, one end of which is connected pivotally to said release member, the other end of which is actuated by a clutch pedal, whereby said disk spring can be deformed and bent resiliently to push said pressure member to release said pressure member from said follower plate when said clutch pedal is operated to actuate said clutch fork to move said release member along said clutch shaft to compress against a portion of said disk spring around said clutch shaft.

* * * * *